Jan. 21, 1936. E. G. BUDD 2,028,135
PNEUMATIC TIRE
Filed Feb. 13, 1933
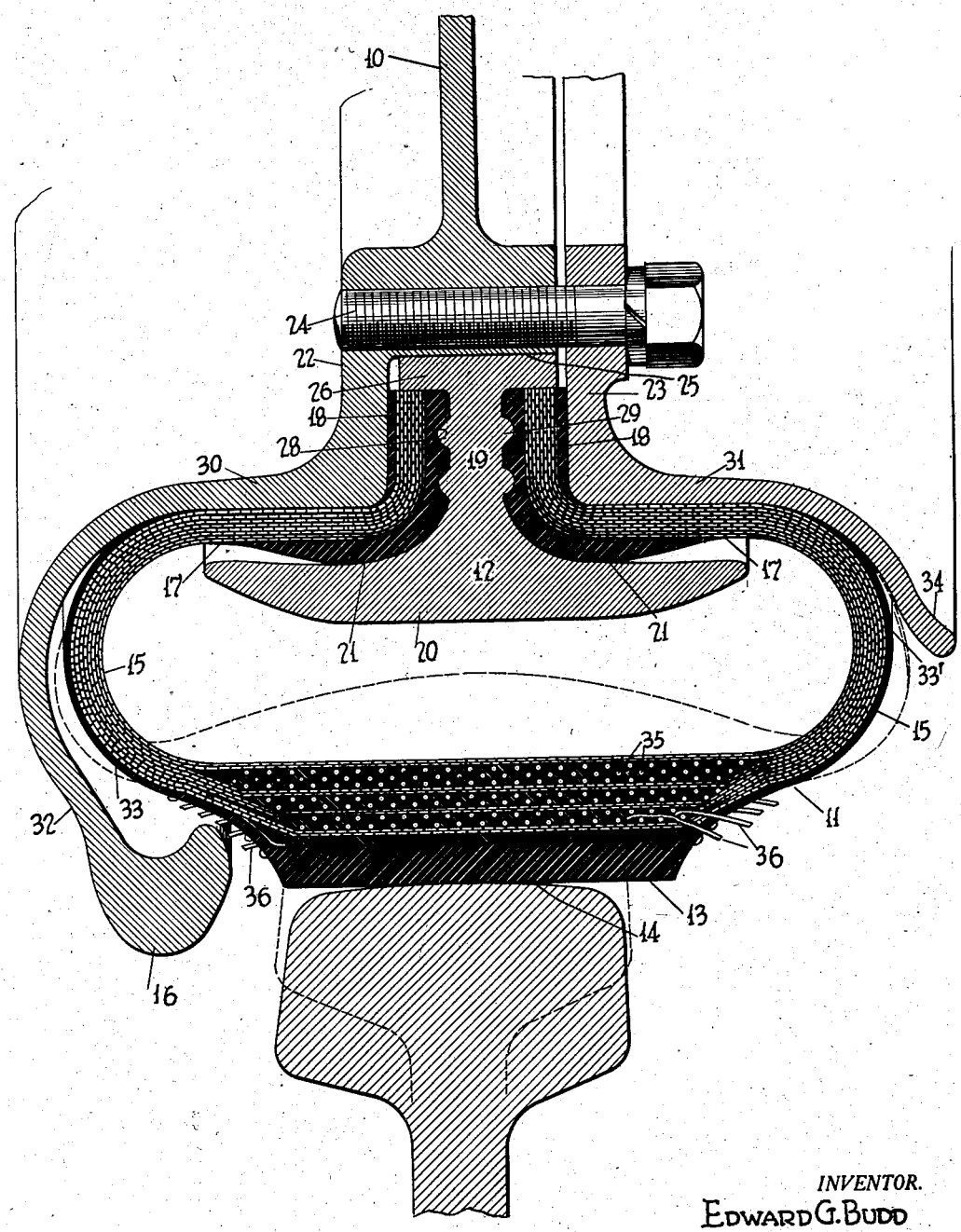
INVENTOR.
EDWARD G. BUDD
BY 
ATTORNEY.

Patented Jan. 21, 1936

2,028,135

UNITED STATES PATENT OFFICE 2,028,135

PNEUMATIC TIRE

Edward G. Budd, Philadelphia, Pa., assignor to Edward G. Budd Manufacturing Company, Philadelphia, Pa., a corporation of Pennsylvania Application February 13, 1933, Serial No. 656,505

6 Claims. (Cl. 295—31)

The pneumatic tired railway wheel which is the subject of this invention has been devised by me to improve the mileage and general durability of rubber tires as utilized on railway vehicles in accordance with the late developments of pneumatic tired railway vehicles. It is possible it may have other adaptations, but the problems solved herein are peculiarly problems met with in the operation of pneumatic tired railway vehicles.

This invention solves each of several correlated problems in connection with such tires. One of the outstanding of such problems is the conduction of the heat away from the rubber of the shoe of the tire at such a rate as to preclude over-heating of the tire under the inordinately high pressures of loadings to which it is subjected in service. The installation of pneumatic tires on railway vehicles has led to the operation of these tires at pressures ranging from seventy pounds to one hundred fifty pounds and endeavors are being made to operate them at pressures of two hundred pounds and upwards. The energy developed in the rubber tire during its operation under these conditions is extremely great. One need not be surprised at this when one recognizes that in this railway service the individual wheel through its tire is called upon to support loads ranging from fifteen hundred pounds to three thousand pounds and upwards and that the width of the head of the rail upon which the tire is supported is relatively very limited as compared with the unrestricted width of the ordinary roadway upon which pneumatic tires of automobiles are called upon to travel. The high heats generated by the absorption of power in the tires under these conditions very rapidly reach the limits of the temperature which the rubber of the tire will stand without rapid deterioration. The pressures and loadings of the tire and the load per wheel and therefore the carrying capacities of the vehicles are limited by these conditions.

In the solution of this problem I propose to use a tire of flattish generally oval cross section transversely as heretofore proposed by me in my co-pending application S. N. 566,020, filed September 30, 1931, to use it as a single tube tire, to render it discontinuous in its inner periphery whereby the air space of this single tube shoe is accessible through such discontinuous periphery, and to incorporate in the gap of the discontinuous periphery a continuous limit drop ring of a cross section adapted jointly to close the said inner periphery and render the tire cross section air tight and at the same time to afford within the air space of the tire a metal annulus in direct contact with the air of the space through such a large and extensive area as to conduct the heat of the air exteriorly of the tire at a very high rate. This limit drop ring I prefer to make of T or I section, one flange or head of which is incorporated within the air space of the tire, and the base or other head of which is in extended contact with the supporting body of the wheel or the rim proper of the wheel to such extent in the direction of transverse cross section of the wheel as to afford a heat conducting path of very large capacity from the limit drop ring to the body of the wheel.

Other problems there are which are solved by the construction which I have devised through details of construction which will be the more fully apparent as the understanding of the invention progresses and which problems are the more appropriately stated in connection with such details.

In the accompanying drawing I have shown the best embodiment of my invention now known to me but, of course, there are others as is the case almost without exception.

The single figure of the drawing shows my invention as a transverse or axial cross section of the wheel in its peripheral portions showing the body of the wheel but partially.

The body of the wheel is designated 10, the flexible pneumatic tire as 11 and the annular limit drop ring as 12.

As clearly appears, the flexible rubber shoe or tire 11 is of flattish or oval cross section, very wide axially and very shallow relatively radially. The tread 13 of this tire is shown in relation to the head 14 of the rail upon which the wheel is to travel. As is clearly apparent, the tread is somewhat wider than the head of the rail, sufficiently so to allow for the usual lateral play of the wheel transversely of the rails, but the width of the transverse cross section of the tire itself is very much greater than the width of the head of the rail, the tire extending laterally therebeyond in opposite lobes 15. Under load the tread 13 is depressed to the dotted line position still further decreasing the radial depth of cross section of the tire.

The limit drop ring, the primary function of which as ordinarily used in connection with the rail car tire is to receive the inner peripheral wall of the tire cross section in case of deflation, prevents drop of the wheel having a deflated tire to such an extent as to carry its flange 16 into engagement with any obstruction which may lie in its pathway alongside of the head of the rail and thereby render operation safe irrespective of deflation of the tire. In this instance, however, it has the additional function of the direct conductor of heat from the air within the interior of the tire to the exterior thereof. It is rendered such a direct conductor of heat by exposing its surface interiorly of the tire directly to the air of the interior without the inter-position of inner tubes of rubber or any other obstructing material.

To this end the shoe 11 is retained a single tube shoe and its discontinuous inner periphery 17 is provided with ears 18 radially inwardly extending by means of which it may be clamped to the opposite sides of the web 19 of the limit drop ring 12 and the limit drop ring constituted the means of rendering the shoe cross section air tight. Thereby the head 20 of this ring 12 is maintained in direct contact at all times with the air within the tire cross section.

This head 20, to serve these ends the better, is made laterally of a very expansive dimension, over-all very greatly in excess of the width of the rail head 14. A width but substantially that of the rail head 14 or at least not greater than that of the tread 13 of the tire would be entirely adequate to support the weight of the vehicle upon deflation of the tire, but by extending this very largely, I greatly increase the area of conducting contact between the limit drop ring 12 and the air within the tire, thereby multiplying the heat conducting capacity of the ring.

Yet further, I snugly contact the inner walls 21 of the inner periphery of the tire with the under sides of the head 20 of the limit drop ring 12 whereby there is a direct solid surface to surface heat conducting contact of very large area between the inner peripheral walls of the tire and the limit drop ring 12, thus carrying heat from the inner and end walls of the tire directly into the limit drop ring independently of the air within the tire.

This pneumatic tire complete with limit drop ring is secured in place to the body 10 of the wheel through oppositely disposed clamping rings 22 and 23, the former of which is formed as illustrated integrally with the body 10 of the wheel, and the latter of which is removably secured thereto by the intermediary of the transverse axially extending clamping bolts 24. Intermediate the main body 10 and the integrally formed clamping ring 22 is an annular shoulder 25 of very considerable axial extent which receives the innermost base or head 26 of the limit drop ring 12. This base is of such lateral extent and generally good contact that it affords a very expansive heat conducting connection between the limit drop ring and the main body 10 of the wheel. From the body, of course, and the connecting parts, as for example, the clamping rings 22 and 23, the heat goes directly to the outer air and very rapidly by reason of the rotation of the wheel constantly in fresh masses of air.

In order to render the closure of the cross section of the shoe 11 by the limit drop ring 12 the more perfect, the ears 18 of the inner periphery 17 are provided with grooves 28 at intervals which grooves are entered into by complemental beads 29 on the web of the limit drop ring. The faces of these ears 18 are appropriately rubberized and appropriately over-sized whereby when the parts are clamped together by the flanking rings 22 and 23, the rubber and other material of the ears and the beads are compressed together and the entire joint is constituted a highly efficient one.

Extended laterally from the clamping rings 22 and 23 respectively in a generally axial direction and gradually turned radially, are annular walls 30 and 31 respectively which support the inner periphery of the flexible shoe 11 much in the same manner as such shoes are supported by the rim of the standard type. The portions so supported, however, are not of the order of the beads found in the ears 18 of the discontinuous inner periphery of the ordinary shoe of the pneumatic tire, but are extensive portions of the inner and side walls of the cross section. The relative axial angles of these walls 30 and 31 and the angle axially of the under sides of the head 20 of the limit drop ring 12 is such that when the rings 18 are clamped tightly together, the rubber and other material of these inner walls 21 of the shoe is tightly caught between parts 20, and 30 and 31 respectively and clamped thereby still further improving the efficiency of the closure of the cross section by the limit drop ring 12.

However, in line with the solution of the main problem of my invention, the dissipation of the heat generated within the tire under the heavy work to which it is put, this intimate contact of the annular supporting walls 30 and 31 with the shoe walls underlying the head 20 of the limit drop ring 12 affords highly effective means of conducting the heat out of the walls of the tire and a highly effective supplemental means of carrying away such portion of the heat from the limit drop ring as may in certain regions of the structure due to the variety of the heat differentials which may be set up, flow from the limit drop ring axially outwardly instead of radially inwardly through the base of the ring to the body 10.

The annular wall 30 lying on the axially inner side of the wheel is extended axially inwardly and radially outwardly and thence again axially outwardly to carry the flange 16 heretofore referred to by means of which the vehicle is kept upon the rails. The extension of this wall is designated 32 and it is to be noted that it lies away from the wall 33 of the tire cross section when the tire is under normal load but, of course, when the tire is deflated it is engaged to a greater or less extent by this side wall whereby the tire is kept laterally in position and at the same time is kept free from damage. Even when the car is in normal operation, this wall 32 prevents undue side sway of the tire under the imposition of forces urging the vehicle laterally.

The opposite annular wall 31 is likewise extended axially outwardly of the vehicle and radially outwardly of the wheel to terminate in the portion 34 lying radially outwardly a sufficient distance from the axis of the wheel to preclude escape of the tire therefrom under deflated conditions, and under inflated conditions to normally lie free of the adjacent side wall of the tire 33' to assist, as in the instance of the opposite side of the structure, in preventing side sway under the imposition of inordinate lateral forces.

The function of my invention in operation is perhaps fully perceived as the description has proceeded. It is well known that the body of air within a tire is swept around by the flattened cross section at the tread engagement by reason of the restriction of the cross section by the flattening. This sweeping around of the air carries it successively over every portion of the interior walls of the tire in succession. Incident to the fact that the head 20 of the ring 12 constitutes a portion of the interior of the cross section of very large area, this air is very largely in contact with the head of the limit drop member 12. Moreover, due to the fact that the tire is in flattish oval in cross section, the radial thickness of the air mass within the tire is at all times relatively small and consequently every portion of the air in all probability comes in contact at some time or other during each revolution with the laterally extensive head of the limit drop ring 12. The heat conducting capacity therefore is multiplied manifoldly, the circulating column of air taking the heat directly from the tread portion of the wheel through its interior wall and transferring it rapidly to the head 20 of the ring 12. This ring itself I prefer to make of aluminum or duralumin of very high heat conducting material and of noncorrosive character and light weight. I prefer too to make the web portion of it laterally relatively thick whereby it cannot constitute a neck to bottle up the heat in the interior. Of non-corrosive character the base of the ring on the seat 25 makes effective heat conducting contact with the body 10 throughout the life of the structure. The wheel body itself may be in the seat 28 at least constituted of non-corrosive material or else provided with a non-corrosive coating.

Yet further to improve the heat conducting qualities of the wheel I propose to embody in the tread 13 thereof metallic conducting strands 35 which constitute the part of the carcass of the shoe which gives it strength and at the same time conducts heat from the interior thereof toward or through the exterior walls thereof. To the latter end, I provide certain of the transverse strands of this material with exteriorly projecting ends 36. These exteriorly projecting ends are shown projecting substantially from the exterior surface of the tire but they may or may not project consequential distances and may instead be bent over as indicated in connection with certain of them. Such bending over will make them easier to handle in the mould or thereafter. The essential factor is that they conduct the heat rapidly from the interior of the tread, where they in many cases contact with the strands 35, directly to the exterior where the air circulation rapidly takes the heat from them.

In the manufacture of the pneumatic tired wheel of this type, the flexible shoe will be made by any of the well known methods of making such shoes, the utilization of collapsible moulds or in any other manner. The ring 12 is intended by me to be made separately and in such case, of course, the relative dimension of the tire cross section and its inwardly extending ears 18, and the radial and other dimensions of the cross section of a limit drop ring, will be made such that the ring can be inserted in place after the shoe 11 has been completed. These relative dimensions are simply a matter of mathematics for the designing engineer or draftsman.

It is my knowledge that on the other hand, there have been utilized alternative constructions in the fabrication of single tube tires and in fabrication of limit drop rings. For example, single tube tires have been originally moulded of closed cross section and in both the closed cross section and the open cross section forms they have been either at the time of moulding or subsequent thereto vulcanized to rings adapted to support them from the bodies of wheels. The utilization of either of these schemes in connection with the fabrication of the wheel of my invention may be availed of if desired. Yet further, the rings themselves have been made in sectionalized form and it is, of course, feasible to utilize the limit drop ring 12 of sectional form in this invention provided only that the sections between the joints be made appropriately tight.

As I have heretofore stated, this invention is susceptible of modification. Each and all such modifications which fall within its generic spirit I desire covered by the annexed claims, irrespective of the circumstantial terminology of the claims and of this specification upon which they are based.

What I claim as new and useful:—

1. In a pneumatic tired railway wheel, a metallic wheel rim, a tire having a discontinuous cross section at its inner periphery and a limit drop ring lying interiorly of the air space of the tire and of generally T cross section having its body engaging the discontinuous extremities of the tire cross section and sealing the same air tight, with its head in heat conducting relation to the interior air of the tire and the foot portion of the T-section in direct thermal contact with the greater portion of the outer surface of the wheel rim.

2. In a pneumatic tired wheel for railway vehicles comprising a flexible pneumatic shoe discontinuous in cross section at its inner periphery together with an annularly continuous ring of T cross section having its head interiorly of the shoe, and beneath the oppositely extending branches of the head to which the flexible shoe is clamped in a manner to enable the ring to complete the tire cross section and to retain it air tight while effecting direct thermal contact with the body material of the wheel over a relatively large area.

3. In a pneumatic tired wheel for railway vehicles comprising a flexible pneumatic shoe discontinuous in cross section at its inner periphery together with an annularly continuous ring of T cross section having its head interiorly of the shoe, beneath the oppositely extending branches of the head of which the flexible shoe is clamped in a manner to enable the ring to complete the tire cross section and to retain it air tight while effecting direct thermal contact with the body material of the wheel over a relatively large area, the width of the head of which T cross section being very substantially greater than the head of the rail in connection with which the tire is used.

4. In a pneumatic tired wheel for railway vehicles comprising a flexible pneumatic shoe discontinuous in cross section at its inner periphery together with an annularly continuous ring of T cross section, having its head interiorly of the shoe, the width of the head of the T cross section being substantially greater than the head of the rail in connection with the tire is used, and a thickened central portion on the head of the T of a width approximately equal to the width of the head of the rail.

5. A pneumatic tire wheel for railway vehicles comprising a flexible pneumatic shoe discontinuous at its inner periphery and a limit drop ring of I cross section the web of which completes the cross section of the tire and renders it air tight, one of the flanges of which I section lies within the air space of the tire, together with a wheel body having in the direction of transverse cross section of the tire an extended area of direct heat conducting contact with the other flange.

6. A pneumatic tire for railway vehicles comprising a flexible pneumatic tire shoe and a one piece annulus of relatively high heat conducting material extending into the air space in the tire and having an axial width greater than that of the normal tread surface of the tire.

EDWARD G. BUDD.